Aug. 23, 1955         J. H. HUNTER         2,715,752
APPARATUS FOR THE MANUFACTURE OF PHONOGRAPH RECORDS
Filed May 2, 1950
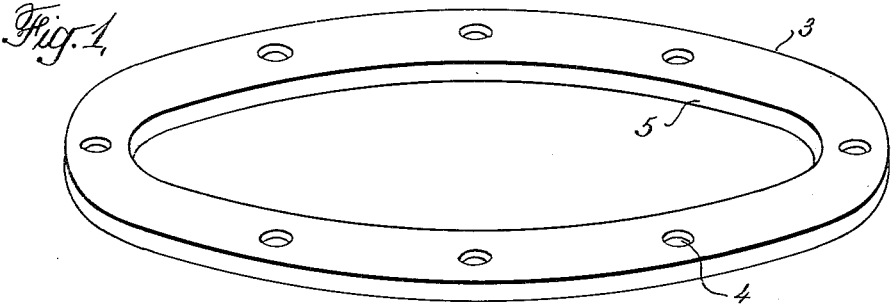
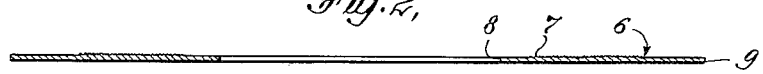
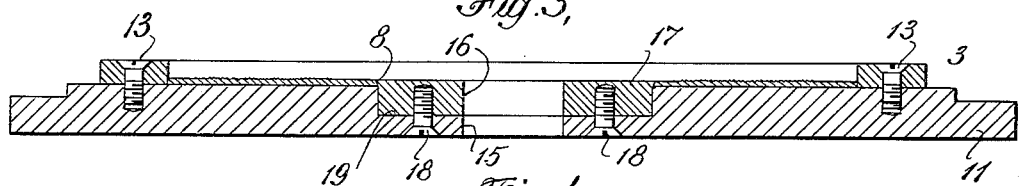
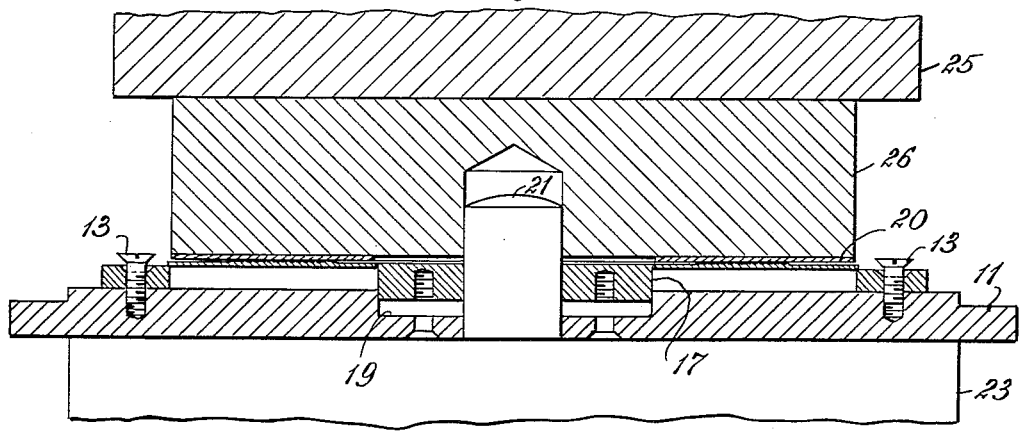
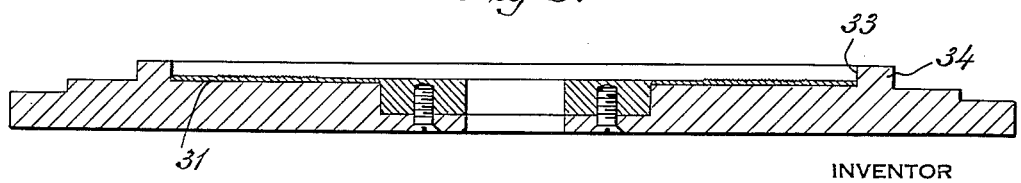
INVENTOR
JAMES H. HUNTER
BY
Pennie, Edmonds, Morton and Barrows
ATTORNEYS

United States Patent Office 2,715,752
Patented Aug. 23, 1955

2,715,752

APPARATUS FOR THE MANUFACTURE OF PHONOGRAPH RECORDS

James H. Hunter, Redding Ridge, Conn., assignor, by mesne assignments, to Columbia Broadcasting System, Inc., New York, N. Y., a corporation of New York Application May 2, 1950, Serial No. 159,517

2 Claims. (Cl. 18—5.3)

This invention relates to the manufacture of phonograph records and more particularly to a means for replaceably mounting in a record press the matrices from which the records are manufactured.

Phonograph records are manufactured by a process of pressing or molding a plastic material in a mold. The material may be placed in the mold in the form of a tablet, or it may be injected into the mold according to methods developed in the injection molding art. In either case a mold cavity is employed having the shape of a finished record. The two faces of the mold cavity are formed by matrices or "stampers," customarily of copper, each bearing in relief a spiral record of the sounds to be imparted to one side of the record. The two matrices representing the two opposite sides of the record must be firmly held in coaxial relation, parallel to each other and separated by a distance equal to the desired thickness of the record.

The pressures within the mold cavity reach very high levels during the record pressing operation, and the means employed to support the matrices must be strong enough to withstand the resultant stress. It is also important that the matrices be readily removable and replaceable as the supporting means are relatively costly and must be available for use with any combination of matrices.

According to the prior art each matrix is held in place on a flat steel plate called an "insert" by means of a clamping ring having an inwardly-extending lip which may be drawn down over the outside edge of the matrix. The clamping ring is provided with screws or similar means for fastening to the insert. The insert in turn is fastened by suitable means to one of the platens of the press.

If a matrix after use with one such clamping ring and insert is removed and subsequently reaffixed to the same or to a different insert and ring, minute but unavoidable shifts in the relative position of the ring and matrix occur. Circular cuts or arcs on the matrix are then exposed to the mold cavity which mar the appearance of the records pressed from the matrix. Minute crevices may also appear between the matrix and the ring into which the plastic material will flow during the pressing or injection operation, rendering difficult the ejection of the records from the press.

The present invention avoids the occurrence of such disfiguring marks on the matrices and makes possible their repeated application to and removal from the supporting insert in which they are held in the record press.

According to the invention the clamping rings of the prior art having an overlying lip are done away with and replaced by a clamping ring having a cylindrical inner surface. A tight fit is secured between the matrix and the ring by reliance on the difference in coefficient of thermal expansion between the copper of the matrix and the iron or steel of which the ring is made. The matrices are finished with a circular outside profile approximately .002 of an inch greater than the inside diameter of the clamping ring when both are at room temperature. In assembly the matrix may be either forced into the clamping ring in a suitable auxiliary press, or it may be caused to enter the ring by creating a substantial temperature differential between the matrix and the ring. The elevated temperature at which the records are pressed or molded results, due to the difference in thermal coefficients, in an extremely tight fit between the matrix and the ring.

The invention will now be described with reference to the accompanying drawings in which Fig. 1 is a perspective view of a clamping ring according to the invention;

Fig. 2 is a vertical section through a matrix adapted for use with either the clamping ring of Fig. 1 or with the combined ring and insert of the embodiment of the invention shown in Fig. 5;

Fig. 3 is a vertical section through an assembled setup of a matrix, clamping ring, and insert according to the invention;

Fig. 4 is a diagrammatic representation of an auxiliary press and jig employed for assembling the matrix of Fig. 2 and clamping ring of Fig. 1, and Fig. 5 is a section similar to that of Fig. 3 but illustrating a modified form of the invention in which the clamping ring and supporting insert are integrally formed together.

The clamping ring of Fig. 1 is made of steel and is characterized by a cylindrical inner surface 5 whose diameter at room temperature is of the order of .002 of an inch less than the diameter at room temperature of the matrices which are to be employed therewith. The ring 3 is provided with circumferentially spaced holes 4 by means of which it can be affixed to the insert or supporting plate presently to be described. The height of the ring between its opposite plane faces should be one-half the desired thickness of the records to be manufactured plus the thickness of the matrix to be held therein.

Fig. 2 illustrates a matrix 6 finished according to the present invention for assembly with a cylindrical clamping ring. The matrix is of flat circular disk shape, having a record spiral 7 in relief thereon and a central aperture 8 which is useful in centering the matrix in the record press.

The matrix is customarily made of fine-grained copper having a hardness not less than 75 on the F scale of a Rockwell hardness tester. According to the invention, the face opposite the record spiral should be finished smooth as by turning in a vacuum chuck lathe to a thickness tolerance of plus or minus .003 inch and with a minimum thickness of .035 inch. The outer surface 9 of the matrix is accurately finished to a cylindrical shape having at room temperature a diameter from .002 to .003 of an inch larger than the inside diameter (also at room temperature) of the clamping ring in which it is to be mounted.

The stress produced by bringing the matrix into the undersize clamping ring (according to methods described below) is increased during the actual molding of the records by the stress of expansion occurring when the copper matrix and steel ring are brought to the elevated pressing temperature. In the manufacture of records by injection molding for example the matrices and the structure in which they are supported, including the clamping ring and insert, are held at a temperature between 140° and 160° F. The resulting stress holds the matrix securely in the ring and against the insert without disfigurement. The greater expansion of the copper seals the matrix so tightly against the clamping ring that no crevices remain between the two into which the plastic material of the records can find its way.

A setup for the support of a matrix in a record press or molding machine is illustrated in Fig. 3. It includes a clamping ring 3, insert 11, and center plate 17. The matrix is supported across its area by the insert 11 and is held circumferentially by the clamping ring 3 which is fastened to the insert by screws or bolts 13. The center aperture 8 in the matrix accommodates a close-fitting circular center plate 17 which centers the matrix on the insert at a circular depression 19 milled into the insert. The depression 19 is concentric with the position of the ring on the insert as established by the screws 13. The center plate may be fastened to the insert as by screws 18. If desired the center plate may have a slightly flared or conical section in order to draw the inside edge of the matrix down onto the insert. When the center plate is drawn down with the screws 18, its upper surface is flush with the exposed face of the matrix.

In view of the disparity in size between the matrix and the clamping ring in which it is to be fastened, the two must be brought together either by power means or by such differential heat treatment as to make it possible for the matrix to slip freely into the ring. Fig. 4 illustrates an auxiliary press for accomplishing this purpose without heat treatment. The insert is supported on the lower platen 23 of a hydraulic or similar power press, and the clamping ring is loosely fastened to the insert by the screws or bolts 13. The matrix is centered on the insert by means of the center plate 17 and by a cylindrical plug 21 fitting through the aperture 15 in the insert and 16 in the center plate. The apertures 15 and 16 are of course concentric with the center plate and depression 19, respectively. A board 20 of micarta or similar relatively soft material is then laid over the matrix to protect the sound spiral from damage, and the matrix is forced down into the ring by means of the upper platen 25 of the press. A cylindrical boss 26 slightly smaller in diameter than the matrix is fastened to the upper platen so that the matrix may be forced down inside the ring into contact over its entire surface with the insert. The cylindrical spaced formed by the apertures 15 and 16 is filled, when the setup is fastened in the record molding machine, by a sprue bushing in the case of the setup on the fixed die head, and by a combined knock out cylinder and coaxial sprue cut-off rod in the case of the setup mounted on the movable die head.

Alternatively, the matrix may be assembled into the setup without power mechanism by expanding the ring by heating until it will slip over the matrix. According to this procedure the matrix is fastened to the insert by means of the center plate which is first slipped through the center hole 8 and then screwed to the insert. The ring is then heated to a temperature at least 100° F. above the pressing temperature. The ring is then dropped quickly over the outside of the matrix, which should then be held flush against the insert while the ring shrinks against the matrix. The ring is lastly drawn tightly down onto the insert by means of the screws 13. If desired the ring may be first fastened to the insert and the two heated together. The matrix with the center plate in position can then be dropped into the ring. After the assembly has cooled, the center plate may be drawn down into the depression 19 by means of the screws provided. This method is particularly well adapted for use with the embodiment of Fig. 5 in which the ring and insert are formed together from a single piece of steel. A variant on these methods consists in leaving the ring at room temperature and chilling the matrix as by means of solid carbon dioxide until it shrinks sufficiently to drop inside the ring.

As illustrated in Fig. 5 the clamping ring and supporting insert may be formed together. In such case the insert exhibits a plane surface 31 for the support of the matrix, exteriorly bounded by a cylindrical wall 33 of an integrally formed ring 34. The wall 33 is of slightly smaller diameter at room temperature than the matrix. The matrix is forced or brought by heat treatment down inside the ring 34 into contact with the surface 31 as outlined above. The coefficient of expansion which characterizes the combined steel insert and clamping ring of Fig. 5 permits as in the case of a simple ring of Fig. 1 a differential heating of the matrix and supporting structure so that the two may be brought into the desired physical relation without the use of power machinery.

Since the matrix when mounted according to the present invention is subjected to very substantial stresses in its own plane, precautions against buckling require that a minimum thickness be maintained for the matrix. Especially in the manufacture of the large records of 10- and 12-inch or larger diameters, it may be found desirable to build up the matrix to a considerably greater thickness than the .035 inch heretofore customary. This may be done either by "growing" the matrix to a greater thickness during the electrodeposition process by which it is produced, or by affixing a supplementary copper plate to the back. Thus if the total matrix thickness is to be .070 inch (and if the thickness of the clamping ring is adjusted accordingly) a hard rolled copper plate of the same diameter as the matrix and of approximately .035 inch may be glued to the back of the matrix grown to .035 inch thickness. A thermosetting cement should be applied between the matrix and the plate. A satisfactory bond has been achieved by holding the two together under a pressure of 2,000 pounds per square inch for 10 minutes at 290° F.

While I have illustrated and described two preferred embodiments of my invention, it is to be understood that the invention may be embodied in other structures varying in details from those hereinbefore described. The scope of my invention is set forth in the appended claims.

I claim:
1. A demountable assembly for the support of a phonograph record matrix in a record press comprising a copper phonograph record matrix of substantially flat disk circular shape having a thickness of the order of .035 inch and a central aperture, a matrix supporting insert bounded in part by a substantially plane surface, an aperture formed in the insert extending through the plane surface, a steel clamping ring adapted to be affixed to the insert about the periphery of the matrix, said clamping ring having a cylindrical inner surface whose diameter at room temperature when unstressed is of the order of .002 inch smaller than the outside diameter of the matrix at room temperature when unstressed, and a center plate adapted to engage the central aperture of the matrix and the aperture in said insert to position the matrix concentrically with the insert aperture.

2. A demountable assembly for the support of a phonograph record matrix in a record press comprising a copper phonograph record matrix of substantially flat circularly cylindrical disk shape, a steel matrix-supporting insert bounded in part by a substantially plane surface, and a steel clamping ring adapted to be affixed to the insert about the circularly cylindrical periphery of the matrix, said ring having a circularly cylindrical inner surface whose diameter when unstressed at room temperature is of the order of .002 inch smaller than the outside diameter of the matrix at room temperature when unstressed.

References Cited in the file of this patent

UNITED STATES PATENTS

| Number | Name | Date |
| --- | --- | --- |
| 847,820 | Prescott | Mar. 19, 1907 |
| 941,291 | Wicks | Nov. 23, 1909 |
| 1,000,156 | Dorff | Aug. 8, 1911 |
| 1,190,072 | Aiken | July 4, 1916 |
| 1,401,966 | Davis et al. | Jan. 3, 1922 |
| 1,692,966 | Treiber | Nov. 27, 1928 |
| 1,943,947 | Bungay | Jan. 16, 1934 |
| 2,027,787 | Ridgway et al. | Jan. 14, 1936 |
| 2,092,880 | Hunter | Sept. 14, 1937 |
| 2,267,339 | Paulsen | Dec. 23, 1941 |
| 2,358,499 | Fiedler | Sept. 19, 1944 |
| 2,441,747 | Beshgetoor | May 18, 1948 |